United States Patent
Lindh et al.

(10) Patent No.: US 9,144,067 B2
(45) Date of Patent: Sep. 22, 2015

(54) FLEXIBLE EXTENSION OF AN INFORMATION BLOCK

(71) Applicant: NOKIA CORPORATION, Espoo (FI)

(72) Inventors: Lars E. Lindh, Helsinki (FI); Klaus Hugl, Vienna (AT)

(73) Assignee: NOKIA TECHNOLOGIES OY, Espoo (FI)

( * ) Notice: Subject to any disclaimer, the term of this patent is extended or adjusted under 35 U.S.C. 154(b) by 156 days.

(21) Appl. No.: 13/836,592

(22) Filed: Mar. 15, 2013

(65) Prior Publication Data

US 2013/0242908 A1  Sep. 19, 2013

Related U.S. Application Data

(60) Provisional application No. 61/611,785, filed on Mar. 16, 2012.

(51) Int. Cl.
*H04W 72/04* (2009.01)
*H04W 28/18* (2009.01)

(52) U.S. Cl.
CPC ............ *H04W 72/042* (2013.01); *H04W 28/18* (2013.01)

(58) Field of Classification Search
CPC .................................................. H04W 72/042
USPC .......... 370/329, 342, 252, 328; 375/260, 270, 375/265, 267
See application file for complete search history.

(56) References Cited

U.S. PATENT DOCUMENTS

| | | | |
|---|---|---|---|
| 5,784,010 A * | 7/1998 | Coker et al. | 341/61 |
| 7,940,642 B2 * | 5/2011 | Chun et al. | 370/208 |
| 8,320,486 B2 * | 11/2012 | Kotecha | 375/267 |
| 8,516,327 B2 * | 8/2013 | Kim et al. | 714/749 |
| 8,908,632 B2 * | 12/2014 | Pi et al. | 370/330 |
| 2007/0260772 A1 * | 11/2007 | Garmonov et al. | 710/33 |
| 2010/0077275 A1 * | 3/2010 | Yu et al. | 714/752 |
| 2010/0303052 A1 * | 12/2010 | Visuri et al. | 370/342 |
| 2011/0170625 A1 * | 7/2011 | Blankenship et al. | 375/295 |
| 2012/0057646 A1 * | 3/2012 | Jovicic et al. | 375/295 |
| 2013/0114759 A1 * | 5/2013 | Buckley et al. | 375/295 |
| 2013/0170469 A1 * | 7/2013 | Yu et al. | 370/330 |

* cited by examiner

*Primary Examiner* — Rasheed Gidado
(74) *Attorney, Agent, or Firm* — Squire Patton Boggs (US) LLP

(57) ABSTRACT

Communication systems in which a fixed size information block is transmitted to one or multiple receivers, such as the long term evolution (LTE) of the 3rd Generation Partnership Projection (3GPP), may benefit from a structure, in which a downlink control information (DCI) format, or more generally the fixed sized information block, can be extended by a small number of bits and still be backwards compatible with older terminals, which do not need the extra bits or may not even be aware of this extension. A method for providing this extension can include preparing a first codeword for transmission. The method can also include preparing a second codeword for transmission. The second codeword can have a code rate that is configured to be less than the code rate of the first codeword. The method can further include initiating simultaneous transmission of the first codeword and the second codeword.

19 Claims, 6 Drawing Sheets

FLEXIBLE EXTENSION OF AN INFORMATION BLOCK

CROSS REFERENCE TO RELATED APPLICATION

This application claims priority of U.S. Provisional Patent Application Ser. No. 61/611,785, filed on Mar. 16, 2012, the contents of which is hereby incorporated by reference.

BACKGROUND

1. Field

Communication systems in which a fixed size information block is transmitted to one or multiple receivers, such as the long term evolution (LTE) of the 3rd Generation Partnership Projection (3GPP), may benefit from a structure, in which a downlink control information (DCI) format, or more generally the fixed sized information block, can be extended by a small number of bits and still be backwards compatible with older terminals, which do not need the extra bits or may not even be aware of this extension.

2. Description of the Related Art

In the long term evolution (LTE) of the 3rd Generation Partnership Projection (3GPP) there are several downlink control information (DCI) formats available optimized for different transmission schemes. A new major feature in the system often requires a new DCI format even though only often a single (new) additional bit will be needed, as such. The standardization effort for a new DCI format is big, requiring extensive discussions in several meetings as well as considerations on the number of blind decodings needed, and is therefore typically not standardized unless deemed absolutely necessary. Moreover, different new DCI formats as such might be needed for different features and/or combination of features, increasing the total amount of possible DCI formats to specify, implement, and test for.

Relatively minor new features in wireless telecommunication systems are often handled with existing downlink control information (DCI) formats by reinterpreting bits, or by making some implicit assumptions regarding some other behaviors. The reuse of DCI formats for new features is limited, because the number of bits in DCI format is limited.

Conventionally, in systems like LTE, there is no structure, in which the DCI format, or more generally the fixed sized information block, can be extended by a small number of bits and still be backwards compatible with older terminals, which do not need the extra bits or may not even be aware of this extension.

SUMMARY

According to a first embodiment, a method includes assigning a first modulated codeword containing control information for transmission. The method also includes assigning a second modulated codeword containing control information for transmission. The second modulated codeword has a code rate that is configured to be less than the code rate of the first modulated codeword. The method further includes initiating simultaneous transmission of the first modulated codeword and the second modulated codeword as a combined codeword to a single user or to multiple users.

According to a second embodiment, an apparatus includes at least one processor and at least one memory including computer program instructions. The at least one memory and the computer program instructions are configured to, with the at least one processor, cause the apparatus at least to assign a first modulated codeword containing control information for transmission. The at least one memory and the computer program instructions are also configured to, with the at least one processor, cause the apparatus at least to assign a second modulated codeword containing control information for transmission. The second modulated codeword has a code rate that is configured to be less than the code rate of the first modulated codeword. The at least one memory and the computer program instructions are further configured to, with the at least one processor, cause the apparatus at least to initiate simultaneous transmission of the first modulated codeword and the second modulated codeword as a combined codeword to a single user or to multiple users.

According to a third embodiment, a method includes obtaining a first information block from a first modulated codeword of a received signal. The method also includes obtaining a second information block from a second modulated codeword of the received signal. The code rate of the second modulated codeword is less than the code rate of the first modulated codeword.

According to a fourth embodiment, an apparatus includes at least one processor and at least one memory including computer program instructions. The at least one memory and the computer program instructions are configured to, with the at least one processor, cause the apparatus at least to obtain a first information block from a first modulated codeword of a received signal. The at least one memory and the computer program instructions are also configured to, with the at least one processor, cause the apparatus at least to obtain a second information block from a second modulated codeword of the received signal. The code rate of the second modulated codeword is less than the code rate of the first modulated codeword.

According to a fifth embodiment, an apparatus includes assigning means for assigning a first modulated codeword containing control information for transmission and for assigning a second modulated codeword containing control information for transmission. The second modulated codeword has a code rate that is configured to be less than the code rate of the first modulated codeword. The apparatus further includes initiating means for initiating simultaneous transmission of the first modulated codeword and the second modulated codeword as a combined codeword to a single user or to multiple users.

According to a sixth embodiment, an apparatus includes obtaining means for obtaining a first information block from a first modulated codeword of a received signal and for obtaining a second information block from a second modulated codeword of the received signal. The code rate of the second modulated codeword is less than the code rate of the first modulated codeword.

According to seventh and eighth embodiments, a non-transitory computer-readable medium is encoded with instructions that, when executed in hardware, perform a process. The process respectively corresponds to the methods of the first and third embodiments.

BRIEF DESCRIPTION OF THE DRAWINGS

For proper understanding of the invention, reference should be made to the accompanying drawings, wherein.

DETAILED DESCRIPTION

Certain embodiments relate to any communication system, where a fixed sized information block is transmitted to one or multiple receivers. For example, certain embodiments relate to the long term evolution (LTE) of the 3rd Generation Partnership Projection (3GPP), in which the layer 1 downlink control messages are made up of a number of fixed sized downlink control information (DCI) formats, which are equipped with cyclic redundancy check (CRC), forward error encoded, rate matched to up four different aggregation levels, modulated and transmitted to one or several users. The final transmitted codeword is known in LTE as the physical downlink control channel (PDCCH).

In Release 11 (Rel-11) of LTE a new downlink control channel is developed and it is known as ePDCCH. The difference between PDCCH and ePDCCH can be summarized in that they are using a different resource mapping with physical downlink shared channel (PDSCH), specifically time division multiplexing (TDM) of PDSCH/PDCCH vs frequency division multiplexing (FDM) for PDSCH/ePDCCH, and using different reference signals for demodulation, specifically cell-specific reference signals (CRS) for PDCCH vs. demodulation reference signals (DM-RS) for ePDCCH. When referring to both PDCCH and ePDCCH the term (e)PDCCH is used herein.

From a coding perspective the transmitted (e)PDCCH is a codeword with error detection capability. Certain embodiments encode an additional small number bits, on the order of about 1-4 bits, into another codeword with exactly the same length as the first codeword. The (e)PDCCH in which the second codeword can be carrying only a few information bits, and therefore can contain plenty of redundancy. Therefore, the second codeword can be transmitted with a very low power on top of the first codeword.

Figure 1:
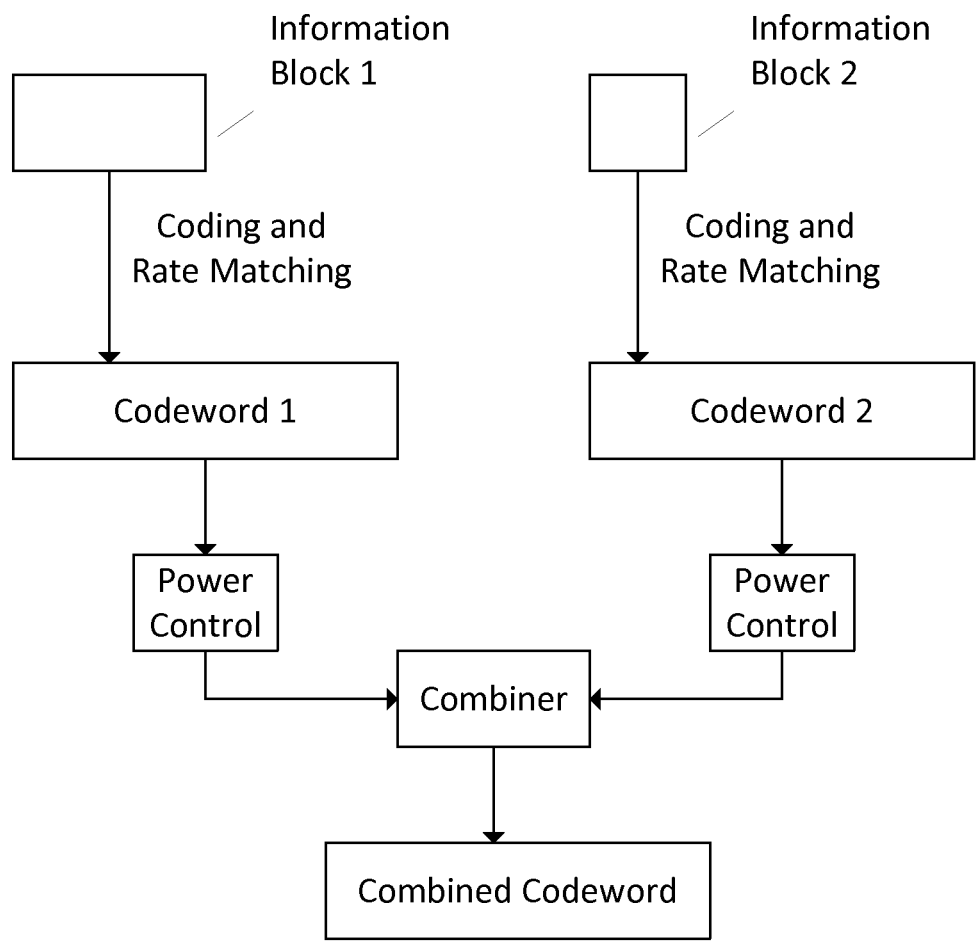
FIG. 1 illustrates the generation of a combined codeword according to certain embodiments.

FIG. 1 illustrates the generation of a combined codeword according to certain embodiments. Referring to FIG. 1, information block 1 can be available as part of an existing standard or procedure and can also have its own forward error correction (FEC) coding, rate matching as well as a link budget, which determines the transmission power for an acceptable reception. Information block 2 can be the additional bits to be added, and can typically use a different coding scheme(s) than the coding scheme(s) used for information block 1. Codeword 2 can have a very/extremely low code rate and does not necessarily include any error detection capability, such as the Codeword 2 does not necessarily include a cyclic redundancy check (CRC). Both codewords can use the same transmission scheme, such as single layer transmission, and can also use the same reference signals for demodulation purposes, such as CRS or DM-RS.

The terminology above can be applied to some actual examples from the LTE standard, as illustrated in Table 1, below:

TABLE 1

| Information block 1 | DCI, PBC | Downlink Control Information, Physical Broadcast channel |
| Information block 2 | XCB | Extra Control Bits |
| Codeword 1 | (e)PDCCH | Control channels in LTE defined above |
| Codeword 2 | XCW | Extra control bits Code Word |

As noted above, codeword 2 can have a very/extremely low code rate and does not necessarily include any error detection capability. Transmit power of codeword 2, containing the extra control bits, can be very low compared to that of the codeword 1, containing (e)PDCCH, and it can, therefore, only inject negligible interference on codeword 1. Alternatively, both codewords are part of (e)PDCCH, although codeword 1 can correspond to a conventional PDCCH. Even if codeword 2 is transmitted with a low power, it can still be detected due to its extremely low code rate. If information block 1 is received correctly, it means that the received bits have sufficient high SNR, which also by proper selection of the relative transmission power for codeword 1 and codeword 2 ensures that information block 2 is correctly received.

As an example, if Information Block 2 only consists of a single bit, repetition code or spreading or a combination thereof, are potential alternatives for coding. The receiver performance for information block 2 can be at least as good as for information block 1, but because the code rate of information block 2 is low, its transmission power can also be very low compared to information block 1. Information block 2 can, of course, introduce some amount of interference on information block 1, so the power of information block 2 can be limited so as not to be higher than needed. The resulting SINR for Information Block 1, which can be referred to as SINR1, can be calculated with the following formula:

$$SINR1 = \frac{S_1}{S_2 + N} = \frac{IBR}{1 + \frac{1 + IBR}{SNR}}$$

In this formula, SNR=S/N, namely signal to noise plus interference ratio (operation point). This can be equal to the SINR for Information Block 1, without the additional transmission of Information Block 2. In other words, this can be the "legacy" SINR. Likewise, the in the formula, IBR=S1/S2, namely the information block ratio, which is the power ratio of Information Block 1 to Information Block 2. Furthermore, in the formula S=S1+S2, namely total transmission power shared between Information Block 1 and Information Block 2. Finally, SINR1=S1/(S2+N), namely signal to noise plus interference ratio on Information Block 1, including the additional transmission of Information Block 2.

Correspondingly, the resulting SINR for Information Block 2, which can be referred to as SINR2, can be calculated with the following formula assuming no interference cancelation in the detection of Information Block 2:

$$SINR2 = \frac{S_2}{S_1 + N} = \frac{1}{IBR + \frac{1 + IBR}{SNR}}$$

Assuming interference cancelation of Information Block 1 in the detection of Information Block 2, SINR2 can be calculated with the following formula:

$$SINR2 = \frac{S_2}{N} = \frac{SNR}{1+IBR}$$

The same nomencluature is used, and SINR1=S2/(S1+N), namely signal to noise plus interference ratio on Information Block 2, including the transmission of Information Block 1.

With these formulas an upper limit of the power of Information Block 2 with respect to power of Information Block 1 can be determined depending on SNR operation point when SINR is known from the receiver specifications of the quadrature phase shift keying (QPSK) modulated codeword 1 as well as codeword2. The lower limit can depend on the actual receiver sensitivity for the reception of information block 2.

Figure 2:
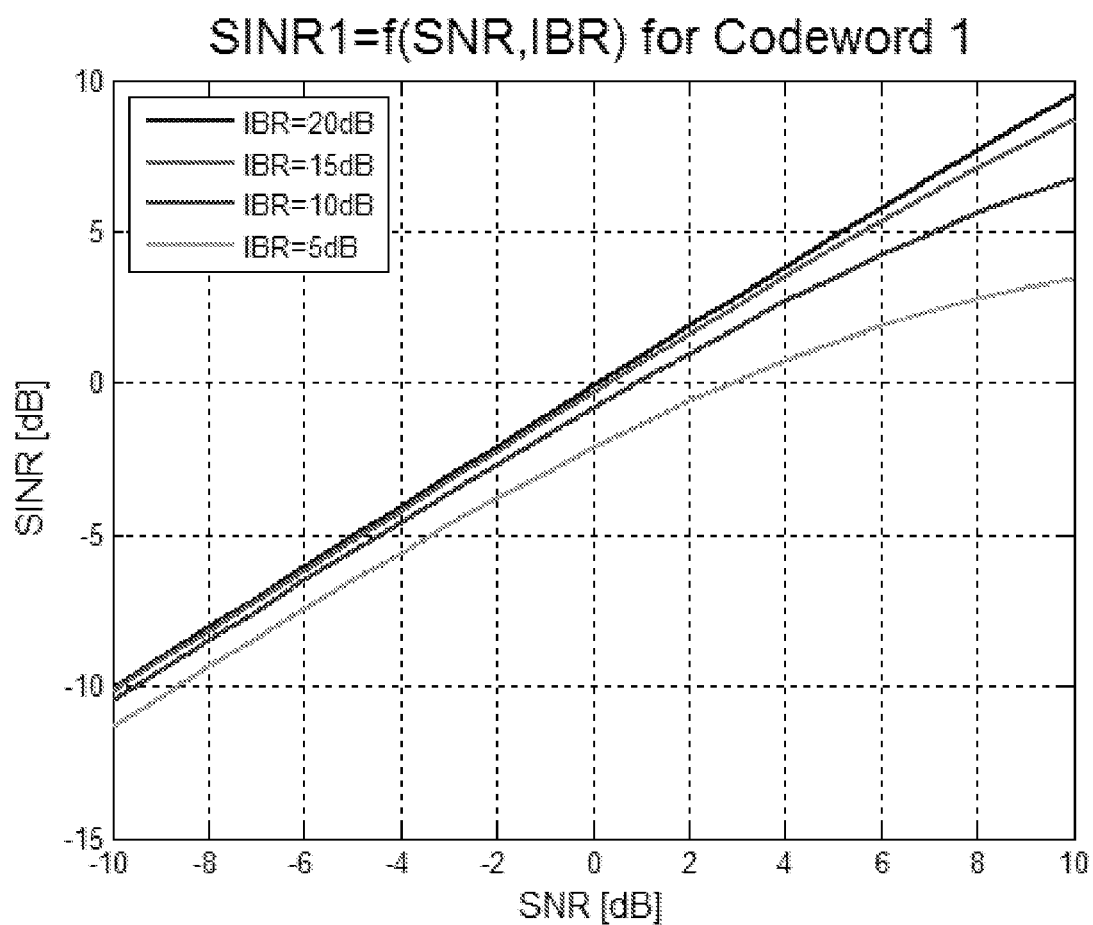
FIG. 2 illustrates the SINR degradation inflicted by certain embodiments of a method.

FIG. 2 illustrates the SINR degradation inflicted by certain embodiments of a method. FIG. 2 more specifically compares the SINR without the additional information block 2 transmission, namely the SNR, with the resulting SINR with the proposed transmission, namely the SINR1 using the nomenclature set forth above. Thus, FIG. 2 illustrates SINR1 as a function of the IBR and SNR.

From the figure it can be see that for a small number of extra bits, SIR=10-20 dB, considering a single bit spread/repeated to 72 bits/36REs of a component carrier element (CCE) of (e)PDCCH, there is practically no SINR degradation for information block 1 due to the additional transmission of information block 2.

Figure 3:
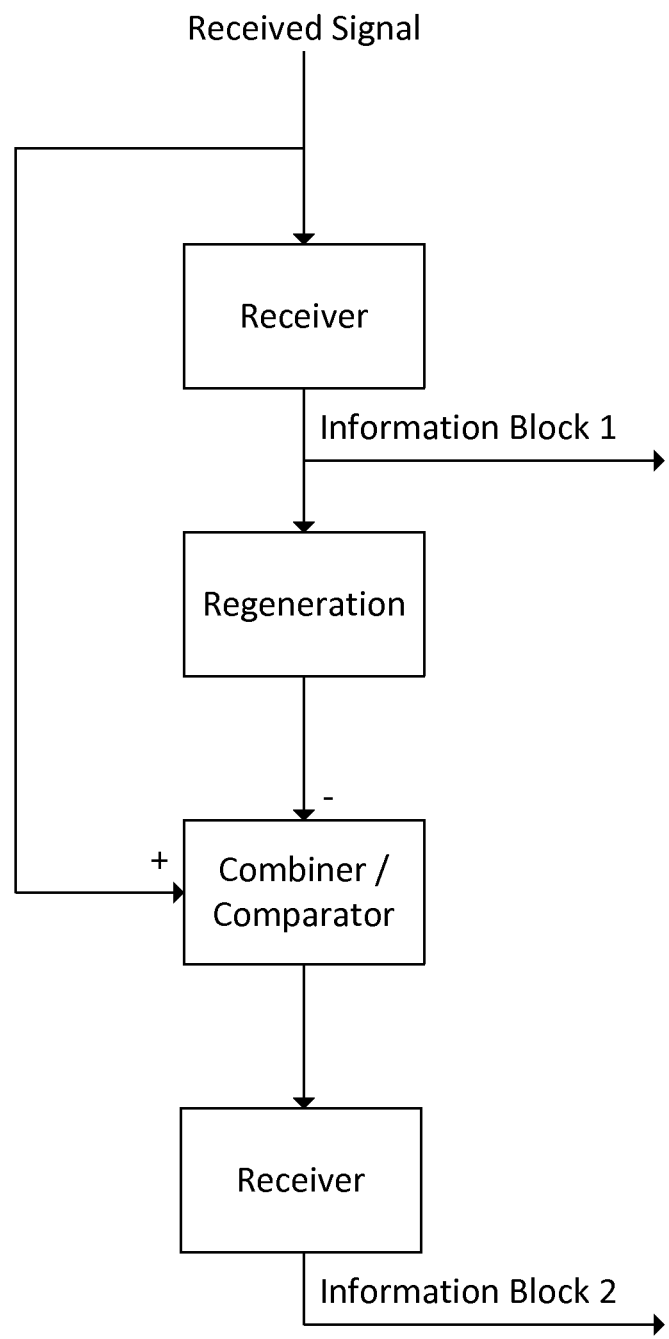
FIG. 3 illustrates interference cancellation reception according to certain embodiments.

FIG. 3 illustrates optional interference cancellation reception according to certain embodiments. In certain embodiments, an interference cancellation receiver can be used, in which codeword 1 is first detected in a receiver. If codeword 1 is correct it can be output and the information block can be re-encoded in the regeneration unit. A combiner or comparator can be used to determine the difference between the original signal and the idealized or regenerated form of encoded information block 1 by subtracting the regenerated signal from the original signal. The difference in this case represents information block 2, which can then separately detected in a receiver as shown in FIG. 3. However, no advanced receiver is required in order to practice certain embodiments.

Certain embodiments can provide a flexible increase of the information block while maintaining backwards compatibility with terminals from an earlier release. Certain embodiments can be applied selectively to part of the UEs depending on the new possible supported features. Moreover, certain embodiments can be applied temporary and conditionally to a UE with configuration signaling. The added bits in codeword 2 can have a different interpretation depending on the mode of operation, on configuration signaling, or a standard. Certain embodiments are efficient, in that no separate error detection for the added bits is needed.

Figure 4:
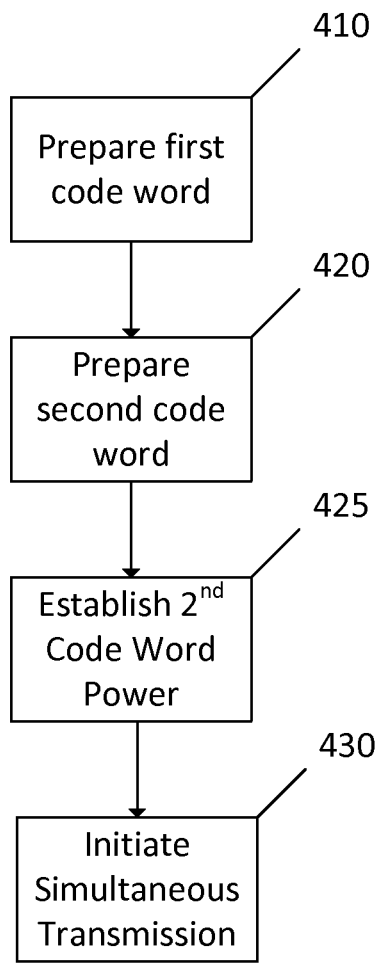
FIG. 4 illustrates a method according to certain embodiments.

FIG. 4 illustrates a method according to certain embodiments. The method can be performed by, for example, an access point such as an eNodeB. As shown in FIG. 4, a method can include, at 410, preparing a first codeword for transmission. This first codeword can be, for example, codeword 1 shown in FIG. 1. The method can also include, at 420, preparing a second codeword for transmission. The second codeword can be, for example, codeword 2 shown in FIG. 1. The second codeword can have a code rate that is less, for example, much less, than the code rate of the first codeword. The method can additionally include, at 425, establishing a relative power of the second codeword with respect to the first code word. The method can further include, at 430, initiating simultaneous transmission of the first codeword and the second codeword as a combined codeword. Subsequently, and responsive to this initiating, the combined codeword can be sent to a single receiving device, which may be, for example, a user equipment.

The second codeword can be transmitted with a lower power than the first codeword. For example, the second codeword can be transmitted with a power low enough that the second codeword does not significantly interfere with the reception of the first codeword. Examples of insignificant interference are interference are illustrated in FIG. 2.

The second codeword can encode an information element in the range of about 1 to 4 bits. In certain embodiments, the information element can have a greater number of bits. The first codeword can be based on and encode at least one of a downlink control information or a physical broadcast channel. Other information elements can alternatively or additionally be included in the first codeword.

Figure 5:
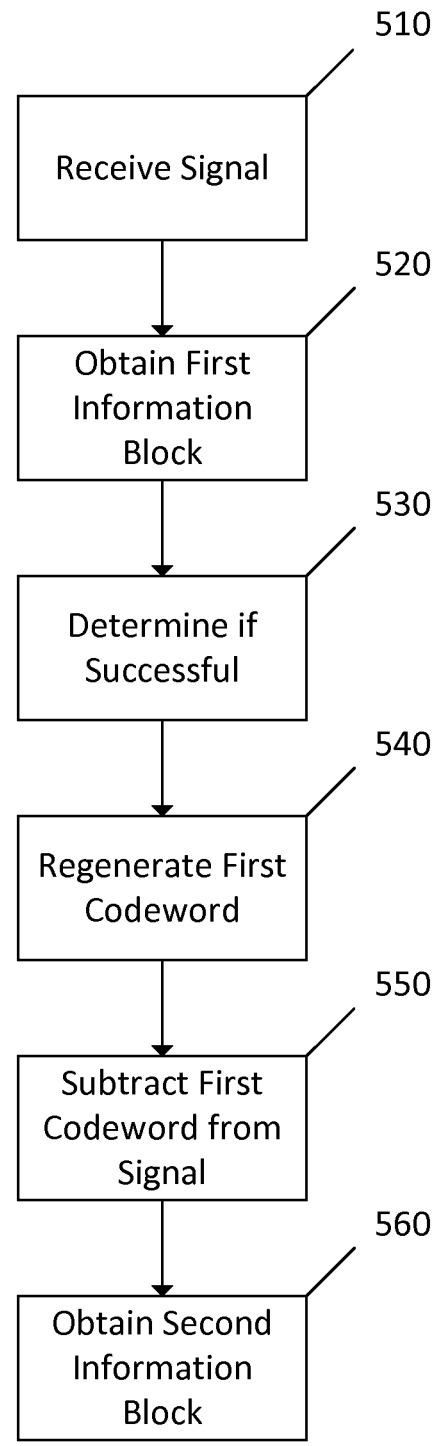
FIG. 5 illustrates another method according to certain embodiments.

FIG. 5 illustrates another method according to certain embodiments. The method can be performed by, for example, a user equipment. As shown in FIG. 5, a method can include, at 510, receiving a signal. The signal received can be a signal that encodes a combined codeword, which includes at least a first and a second codeword. The signal can correspond to the signal illustrated in FIG. 3, for example.

The method can also include, at 520, obtaining a first information block from a first codeword of a received signal. This first codeword can be, for example, codeword 1 illustrated in FIG. 1. This first codeword can be obtained by decoding the received signal in a receiver.

The method can also include, at 530, determining whether or not the first information block was successfully decoded. The method can further include, at 560, obtaining a second information block from a second codeword of the received signal. This obtaining the second information block can be performed contingent on the result of the determining. In other words, in certain embodiments, the obtaining the second information block is only performed when the obtaining the first information block was successful. The second codeword can be, for example, codeword 2 illustrated in FIG. 1. The code rate of the second codeword can be less than the code rate of the first codeword.

Prior to obtaining the second information block, the method can include, at 540, regenerating the first codeword based on the successfully obtained first information block. The obtaining the second codeword can then include subtracting, at 550, a regenerated version of the first codeword from the received signal.

Figure 6:
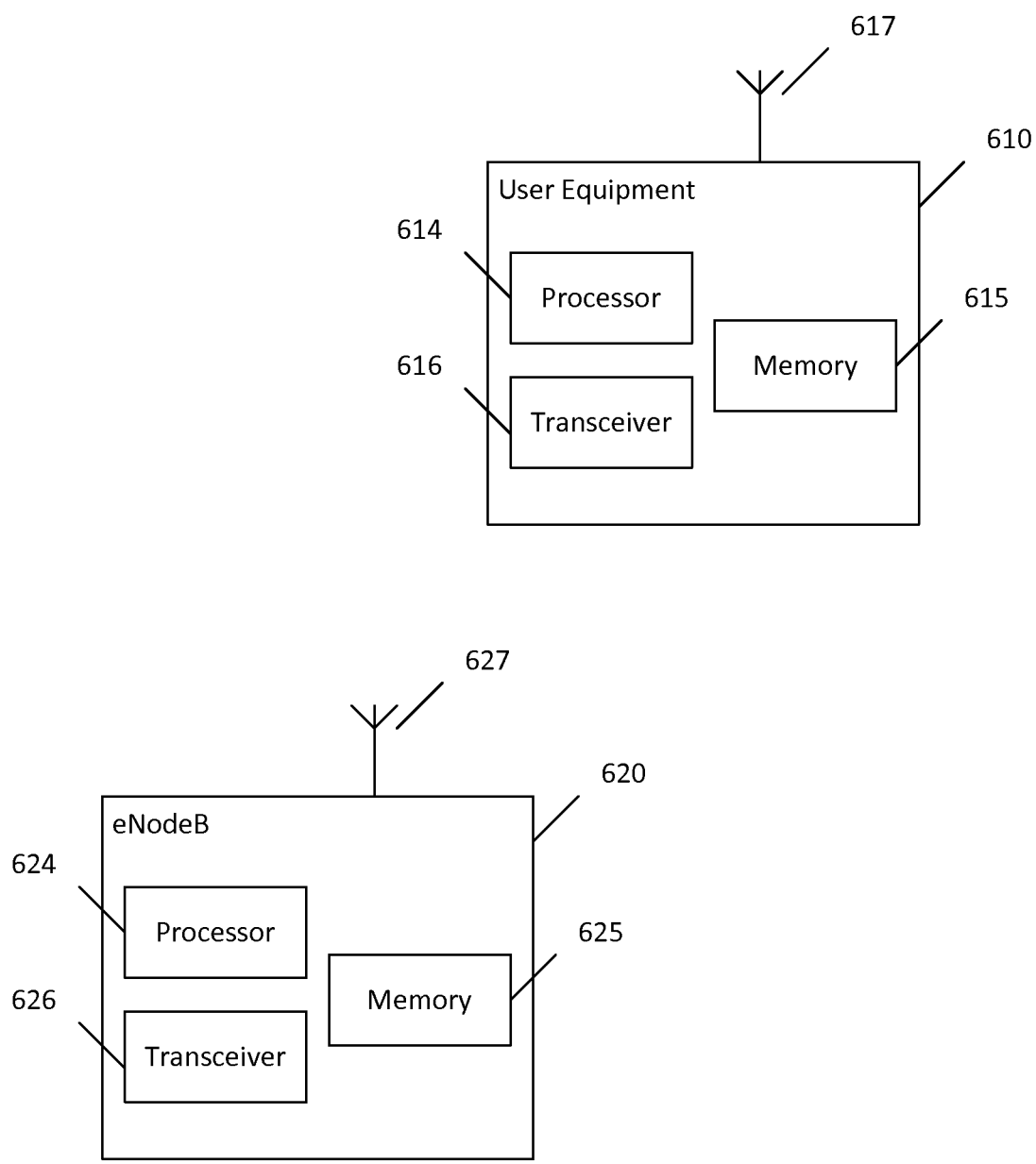
FIG. 6 illustrates a system according to certain embodiments.

FIG. 6 illustrates a system according to certain embodiments. In an example embodiment, a system may include two devices, user equipment (UE) 610 and eNodeB 620. Each of the devices 610 and 620 may be equipped with at least one processor (respectively 614 and 624), at least one memory (respectively 615 and 625) (including computer program instructions or code), a transceiver (respectively 616 and 626), and an antenna (respectively 617 and 627). There is no requirement that each of these devices be so equipped. For example, the eNodeB 620 may be equipped for wired communication with a core network (not shown).

The transceiver (respectively 616 and 626) can be a transmitter, a receiver, both a transmitter and a receiver, or a unit that is configured both for transmission and reception. The transceiver (respectively 616 and 626) can be coupled to corresponding one or more antenna(s) (respectively 617 and 627), which may include a directional antenna.

The at least one processor (respectively 614 and 624) can be variously embodied by any computational or data processing device, such as a central processing unit (CPU) or application specific integrated circuit (ASIC). The at least one processor (respectively 614 and 624) can be implemented as one or a plurality of controllers.

The at least one memory (respectively 615 and 625) can be any suitable storage device, such as a non-transitory computer-readable medium. For example, a hard disk drive (HDD) or random access memory (RAM) can be used in the at least one memory (respectively 615 and 625). The at least one memory (respectively 615 and 625) can be on a same chip as the corresponding at least one processor (respectively 614 and 624), or may be separate from the corresponding at least one processor (respectively 614 and 624).

The computer program instructions may be any suitable form of computer program code. For example, the computer program instructions may be a compiled or interpreted computer program.

The at least one memory (respectively 615 and 625) and computer program instructions can be configured to, with the at least one processor (respectively 614 and 624), cause a hardware apparatus (for example, user equipment 610 or eNodeB 620) to perform a process, such as any of the processes described herein (see, for example, FIGS. 1 and 3-5).

Thus, in certain embodiments, a non-transitory computer-readable medium can be encoded with computer instructions that, when executed in hardware perform a process, such as one of the processes described herein. Alternatively, certain embodiments of the present invention may be performed entirely in hardware.

The devices of the system may also include additional components. For example, each of user equipment 610 and eNodeB 620 can include a user interface that is operable connected to the processor (respectively 614 and 624) and memory (respectively 615 and 625). That user interface can include a display, such as a liquid crystal display (LCD) or organic electroluminescent display (OELD), as well as speakers or audio outputs. Tactile outputs, such as a haptic feedback system, can also be included. The user interface may have a touch screen to receive user input. User input can also be provided by a keypad, keyboard, microphone, joystick, mouse, trackball, or other input device. Of course, there is no requirement that the devices include a user interface. For example, the eNodeB 620 may be embodied in part as a rack-mounted computer.

The devices of the system can also include peripheral devices that are connected wirelessly by, for example, a short-range wireless connection. Thus the devices of the system can be configured with more than one radio system, and can be configured for operation in more than one mode.

Although FIG. 6 illustrates a system including a base station and a terminal device, certain embodiments may be applicable to other embodiments. For example, certain embodiments may be applicable to device to device communications between terminals in a cluster or other arrangement.

Various embodiments and modifications are possible. For example, a method according to certain embodiments can include preparing a first codeword for transmission. The method also can include preparing a second codeword for transmission, wherein the second codeword has a code rate that is configured to be less than the code rate of the first codeword. The method further can include initiating simultaneous transmission of the first codeword and the second codeword as a combined codeword.

Initiating the simultaneous transmission can include initiating the transmission of the second codeword with a lower power than the first codeword.

Initiating the simultaneous transmission can include initiating the transmission of the combined codeword to a single receiver.

Preparing the second codeword can include preparing a codeword based on an information element in the range of 1 to 4 bits.

Preparing the first codeword can include preparing the first codeword based on at least one of a downlink control information or a physical broadcast channel.

An apparatus according to certain embodiments can include at least one processor and at least one memory including computer program instructions. The at least one memory and the computer program instructions are configured to, with the at least one processor, cause the apparatus at least to prepare a first codeword for transmission. The at least one memory and the computer program instructions are also configured to, with the at least one processor, cause the apparatus at least to prepare a second codeword for transmission. The second codeword has a code rate that is configured to be less than the code rate of the first codeword. The at least one memory and the computer program instructions are further configured to, with the at least one processor, cause the apparatus at least to initiate simultaneous transmission of the first codeword and the second codeword as a combined codeword.

The at least one memory and the computer program instructions can be configured to, with the at least one processor, cause the apparatus at least to initiating the simultaneous transmission of the second codeword with a lower power than the first codeword.

The at least one memory and the computer program instructions can be configured to, with the at least one processor, cause the apparatus at least to initiate the simultaneous transmission of the combined codeword to a single receiver.

The at least one memory and the computer program instructions can be configured to, with the at least one processor, cause the apparatus at least to prepare the second codeword based on an information element in the range of 1 to 4 bits.

The at least one memory and the computer program instructions can be configured to, with the at least one processor, cause the apparatus at least to prepare the first codeword based on at least one of a downlink control information or a physical broadcast channel.

In certain embodiments, an apparatus can include preparing means for preparing a first codeword for transmission and for preparing a second codeword for transmission, wherein the second codeword has a code rate that is configured to be less than the code rate of the first codeword. The apparatus also can include transmission means for initiating simultaneous transmission of the first codeword and the second codeword as a combined codeword.

The transmitting means can be configured for initiating the transmission of the second codeword with a lower power than the first codeword.

The transmitting means can be configured for initiating the transmission of the combined codeword to a single receiver.

The preparing means can be configured for preparing a codeword based on an information element in the range of 1 to 4 bits.

The preparing means can be configured for preparing the first codeword based on at least one of a downlink control information or a physical broadcast channel.

According to certain embodiments, a non-transitory computer readable medium is encoded with instructions that, when executed in hardware, perform a process. The process can include preparing a first codeword for transmission. The process also can include preparing a second codeword for transmission, wherein the second codeword has a code rate that is configured to be less than the code rate of the first codeword. The process further can include initiating simultaneous transmission of the first codeword and the second codeword as a combined codeword.

Initiating the simultaneous transmission can include initiating the transmission of the second codeword with a lower power than the first codeword.

Initiating the simultaneous transmission can include initiating the transmission of the combined codeword to a single receiver.

Preparing the second codeword can include preparing a codeword based on an information element in the range of 1 to 4 bits.

Preparing the first codeword can include preparing the first codeword based on at least one of a downlink control information or a physical broadcast channel.

A method according to certain embodiments can include obtaining a first information block from a first codeword of a received signal. The method also can include obtaining a second information block from a second codeword of the received signal, wherein the code rate of the second codeword is less than the code rate of the first codeword.

The obtaining the second codeword can include subtracting a regenerated version of the first codeword from the received signal.

The obtaining the second codeword can be contingent on a determination that the obtaining the first information block was successful.

An apparatus according to certain embodiments can include at least one processor and at least one memory including computer program instructions. The at least one memory and the computer program instructions are configured to, with the at least one processor, cause the apparatus at least to obtain a first information block from a first codeword of a received signal. The at least one memory and the computer program instructions are also configured to, with the at least one processor, cause the apparatus at least to obtain a second information block from a second codeword of the received signal, wherein the code rate of the second codeword is less than the code rate of the first codeword.

The at least one memory and the computer program instructions can be configured to, with the at least one processor, cause the apparatus at least to obtain the second codeword by subtracting a regenerated version of the first codeword from the received signal.

The at least one memory and the computer program instructions can be configured to, with the at least one processor, cause the apparatus at least to obtain the second codeword contingent on a determination that the obtaining the first information block was successful.

An apparatus according to certain embodiments can include obtaining means for obtaining a first information block from a first codeword of a received signal. The apparatus also can include additional obtaining means for obtaining a second information block from a second codeword of the received signal, wherein the code rate of the second codeword is less than the code rate of the first codeword.

The additional obtaining means can be configured for obtaining the second codeword by subtracting a regenerated version of the first codeword from the received signal.

The additional obtaining means can be configured for obtaining the second codeword contingent on a determination that the obtaining the first information block was successful.

According to certain embodiments, a non-transitory computer readable medium is encoded with instructions that, when executed in hardware, perform a process. The process can include obtaining a first information block from a first codeword of a received signal. The process also can include obtaining a second information block from a second codeword of the received signal, wherein the code rate of the second codeword is less than the code rate of the first codeword.

The obtaining the second codeword can include subtracting a regenerated version of the first codeword from the received signal.

The obtaining the second codeword can be contingent on a determination that the obtaining the first information block was successful.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
assigning a first modulated codeword containing control information for transmission;
assigning a second modulated codeword containing control information for transmission, wherein the second modulated codeword has a code rate that is configured to be less than the code rate of the first modulated codeword; and
initiating simultaneous transmission of the first modulated codeword and the second modulated codeword as a combined codeword to a single user or to multiple users, by using a same multi-antenna precoded transmission on same resource elements for the first modulated codeword and the second modulated codeword.

2. The method of claim 1, wherein the initiating the simultaneous transmission comprises initiating the transmission of the second modulated codeword with a lower power than the first modulated codeword.

3. The method of claim 1, wherein the assigning the second modulated codeword comprises assigning a codeword based on an information element, which is smaller than that of the first codeword and could as a minimum be in the range of 1 to 4 bits.

4. The method of claim 1, wherein the assigning the second modulated codeword comprises assigning a codeword using repetition coding or spreading.

5. The method of claim 1, wherein the assigning the first modulated codeword comprises assigning the first modulated codeword based on at least one of a downlink control information or a physical broadcast channel.

6. The method of claim 1, wherein the first modulated codeword and the second modulated codeword are transmitted from one or several antennas.

7. The method of claim 1, wherein the assigning the second modulated codeword comprises assigning the second modulated codeword based on other control information transmitted in downlink.

8. The method of claim 1, wherein the first modulated codeword is used for enhanced physical downlink control channel in long term evolution, and the second modulated codeword is used for extra control bits.

9. The method of claim 1, wherein the second modulated codeword does not include error detection capability.

10. An apparatus, comprising:
at least one processor; and at least one memory including computer program instructions, wherein the at least one memory and the computer program instructions are configured to, with the at least one processor, cause the apparatus at least to assign a first modulated codeword containing control information for transmission;

assign a second modulated codeword containing control information for transmission, wherein the second modulated codeword has a code rate that is configured to be less than the code rate of the first modulated codeword; and initiate simultaneous transmission of the first modulated codeword and the second modulated codeword as a combined codeword to a single user or to multiple users, by using a same multi-antenna precoded transmission on same resource elements for the first modulated codeword and the second modulated codeword.

11. The apparatus of claim 10, wherein the at least one memory and the computer program instructions are configured to, with the at least one processor, cause the apparatus at least to initiating the simultaneous transmission of the second modulated codeword with a lower power than the first modulated codeword.

12. The apparatus of claim 10, wherein the at least one memory and the computer program instructions are configured to, with the at least one processor, cause the apparatus at least to assign the second modulated codeword based on an information element, which is smaller than that of the first codeword.

13. The apparatus of claim 10, wherein the at least one memory and the computer program instructions are configured to, with the at least one processor, cause the apparatus at least to assign the first modulated codeword based on at least one of a downlink control information or a physical broadcast channel.

14. A method, comprising:

obtaining a first information block from a first modulated codeword of a received signal;

obtaining a second information block from a second modulated codeword of the received signal wherein the code rate of the second modulated codeword is less than the code rate of the first modulated codeword, wherein the first modulated codeword and the second modulated codeword are received from a same multi-antenna precoded transmission on same resource elements.

15. The method of claim 14, wherein the obtaining the second modulated codeword comprises subtracting a regenerated version of the first modulated codeword from the received signal.

16. The method of claim 14, wherein same reference signals are used for demodulation of the first modulated codeword and the second modulated codeword.

17. An apparatus, comprising:

at least one processor; and at least one memory including computer program instructions, wherein the at least one memory and the computer program instructions are configured to, with the at least one processor, cause the apparatus at least to obtain a first information block from a first modulated codeword of a received signal; and obtain a second information block from a second modulated codeword of the received signal, wherein the code rate of the second modulated codeword is less than the code rate of the first modulated codeword, wherein the first modulated codeword and the second modulated codeword are received from a same multi-antenna precoded transmission on same resource elements.

18. The apparatus of claim 17, wherein the at least one memory and the computer program instructions are configured to, with the at least one processor, cause the apparatus at least to obtain the second modulated codeword by subtracting a regenerated version of the first modulated codeword from the received signal.

19. The apparatus of claim 17, wherein the at least one memory and the computer program instructions are configured to, with the at least one processor, cause the apparatus at least to obtain the second modulated codeword contingent on a determination that the obtaining the first information block was successful.

\* \* \* \* \*